United States Patent
Takeyama et al.

(10) Patent No.: US 10,780,748 B2
(45) Date of Patent: Sep. 22, 2020

(54) TIRE CONDITION DETECTING DEVICE

(71) Applicant: PACIFIC INDUSTRIAL CO., LTD., Ogaki-shi, Gifu-ken (JP)

(72) Inventors: Takashi Takeyama, Ichinomiya (JP); Yasuhisa Tsujita, Motosu (JP)

(73) Assignee: PACIFIC INDUSTRIAL CO., LTD., Ogaki-Shi, Gifu-Ken (JP)

( * ) Notice: Subject to any disclaimer, the term of this patent is extended or adjusted under 35 U.S.C. 154(b) by 0 days.

(21) Appl. No.: 16/471,721

(22) PCT Filed: Oct. 30, 2017

(86) PCT No.: PCT/JP2017/039119
§ 371 (c)(1),
(2) Date: Jun. 20, 2019

(87) PCT Pub. No.: WO2019/087245
PCT Pub. Date: May 9, 2019

(65) Prior Publication Data
US 2019/0329604 A1      Oct. 31, 2019

(51) Int. Cl.
*B60C 23/04*      (2006.01)
*H04Q 9/00*       (2006.01)

(52) U.S. Cl.
CPC .......... *B60C 23/0408* (2013.01); *H04Q 9/00* (2013.01); *H04Q 2209/00* (2013.01); *H04Q 2209/40* (2013.01); *H04Q 2209/47* (2013.01)

(58) Field of Classification Search
CPC .. B60C 23/0408; H04Q 9/00; H04Q 2209/00; H04Q 2209/40; H04Q 2209/43; H04Q 2209/47; H04Q 2209/50; H04Q 2209/75
See application file for complete search history.

(56) References Cited

U.S. PATENT DOCUMENTS

| 7,212,989 | B1 * | 5/2007 | Taniguchi | G06Q 20/20 340/905 |
| 2004/0135681 | A1 * | 7/2004 | Tsujita | B60C 23/0408 340/442 |

FOREIGN PATENT DOCUMENTS

| JP | 2002064402 A | 2/2002 |
| JP | 2005319870 A | 11/2005 |

(Continued)

OTHER PUBLICATIONS

International Search Report issued in International Application No. PCT/JP2017/039119, dated Jan. 16, 2018, completed Dec. 25, 2017; 1 page.

*Primary Examiner* — Franklin D Balseca
(74) *Attorney, Agent, or Firm* — Cantor Colburn LLP

(57) ABSTRACT

A transmitter includes a condition detecting section, which detects a condition of a tire, a memory section, which stores identification information, a transmitting section, which transmits a data signal, a trigger receiving section, which receives a trigger signal transmitted from a trigger device, and a controlling section. When the trigger receiving section receives the trigger signal, the controlling section generates data corresponding to the trigger signal and causes the transmitting section to transmit the data signal, which includes the generated data. The controlling section generates encrypted data when the trigger receiving section receives a trigger signal of unmodulated waves. The controlling section generates non-encrypted data that includes the identification information when the trigger receiving section receives a trigger signal of modulated waves.

4 Claims, 4 Drawing Sheets

(56) References Cited

FOREIGN PATENT DOCUMENTS

| | | | |
|---|---|---|---|
| JP | 2006005497 | A | 1/2006 |
| JP | 2008155852 | A | 7/2008 |
| JP | 2012240499 | A | 12/2012 |
| JP | 2014091344 | A | 5/2014 |
| JP | 2017009833 | A | 1/2017 |
| JP | 2017046348 | A | 3/2017 |
| WO | 2019087245 | A1 | 9/2019 |

* cited by examiner

Fig.8
| Preamble | Identifying Code | Pressure Data | Temperature Data | Stator Code | Error Detection Code |
Fig.9
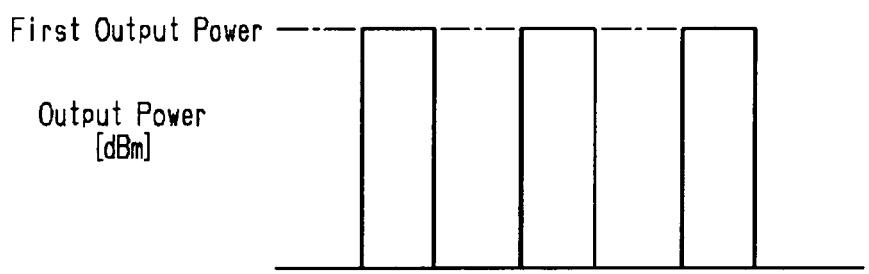
Fig.10
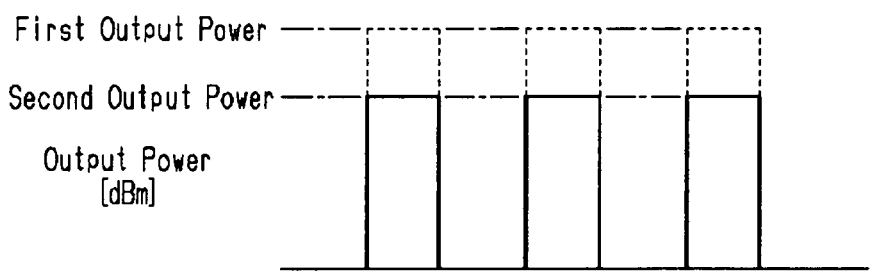

TIRE CONDITION DETECTING DEVICE

TECHNICAL FIELD

The present invention relates to a tire condition detecting device.

BACKGROUND ART

Patent Document 1 discloses one example of a tire condition monitoring apparatus installed in a vehicle equipped with wheel assemblies. The tire condition monitoring apparatus of Patent Document 1 includes a receiver and tire condition detecting devices, which are respectively attached to the wheel assemblies.

Each tire condition detecting device includes a condition detecting section, which detects the state of the tire, a transmitting section, which transmits a data signal including data such as the detection result of the condition detecting section, and a controlling section, which controls the tire condition detecting device. The transmitting section transmits data signals at predetermined intervals.

The tire condition detecting device also includes a trigger receiving section, which is capable of receiving a trigger signal transmitted from a trigger device. The trigger signal is transmitted when giving a command to the tire condition detecting device from the outside. The trigger signal is transmitted, for example, when transmission of a data signal at arbitrary timing is desired, when whether the tire condition detecting device is operating normally is inspected, when a change in the transmission interval of the data signal is desired, or when identification information is intended to be registered. The controlling section controls the tire condition detecting device in response to the trigger signal. The identification information is separately set for each tire condition detecting device.

PRIOR ART DOCUMENT

Patent Document

Patent Document 1: Japanese Laid-Open Patent Publication No. 2014-91344

SUMMARY OF THE INVENTION

Problems that the Invention is to Solve

Types of trigger device include ones that transmit trigger signals of unmodulated waves and ones that transmit trigger signals of modulated waves. Trigger signals of unmodulated waves are easy to imitate. If a third person imitates a trigger signal of unmodulated waves and a tire condition detecting device that has received the imitated signal transmits a data signal containing identification information, that identification information may be leaked.

Accordingly, it is an objective of the present invention to provide a tire condition detecting device capable of preventing leakage of identification information.

Means for Solving the Problems

In one general aspect, a tire condition detecting device is provided that includes a condition detecting section, which is configured to detect a condition of a tire, a memory section, which stores identification information, a transmitting section, which is configured to transmit a data signal, a trigger receiving section, which is configured to receive a trigger signal transmitted from a trigger device, and a controlling section, which is configured to, when the trigger receiving section receives the trigger signal, generate data corresponding to the trigger signal and cause the transmitting section to transmit the data signal, which includes the generated data. The controlling section is configured to generate the data that is encrypted when the trigger receiving section receives the trigger signal of unmodulated waves. The controlling section is also configured to generate the data that is non-encrypted when the trigger receiving section receives the trigger signal of modulated waves.

When the trigger receiving section receives a trigger signal of unmodulated waves, a data signal including encrypted data is transmitted from the transmitting section. Even if a third person imitates the trigger signal and receives the data signal, the encrypted data cannot be decrypted, so that leakage of the identification information is prevented. When the trigger receiving section receives a trigger signal of modulated waves, a data signal including non-encrypted data is transmitted from the transmitting section. Trigger signal of modulated waves are difficult to imitate. Thus, in the case of receiving a trigger signal of modulated waves, leakage of identification information is unlikely to occur even if the non-encrypted data.

In the above-described condition detecting device, encryption of the data may be performed using, as a key, the identification information itself or information based on the identification information.

The identification information is separately set for each tire condition detecting device. Separate keys can be used for each tire condition detecting device by using, as the key of encryption, identification information itself or information based on the identification information. If encryption is performed using a common key, leakage of the key will allow the encrypted data to be decrypted for all the tire condition detecting devices. In contrast, if the separate keys are used, leakage of a key (identification information) will only allow the encrypted data to be decrypted for the tire condition detecting device that uses the leaked key. Therefore, it is possible to further suppress the leakage of identification information of the tire condition detecting device.

In another aspect, a tire condition detecting device is provided that includes a condition detecting section, which is configured to detect a condition of a tire, a memory section, which stores identification information, a transmitting section, which is configured to transmit a data signal, a trigger receiving section, which is configured to receive a trigger signal transmitted from a trigger device, and a controlling section, which is configured to, when the trigger receiving section receives the trigger signal, generate data corresponding to the trigger signal and cause the transmitting section to transmit the data signal, which includes the generated data. The controlling section is configured to generate the data that does not include the identification information when the trigger receiving section receives the trigger signal of unmodulated waves. The controlling section is also configured to generate the data that includes the identification information when the trigger receiving section receives the trigger signal of modulated waves.

Even if a third person imitates the trigger signal of unmodulated waves and receives a data signal, the data signal will not include identification information. This prevents leakage of the identification information.

In yet another aspect, a tire condition detecting device is provided that includes a condition detecting section, which is configured to detect a condition of a tire, a memory section, which stores identification information, a transmitting section, which is configured to transmit a data signal, a trigger receiving section, which is configured to receive a trigger signal transmitted from a trigger device, and a controlling section, which is configured to, when the trigger receiving section receives the trigger signal, generate data corresponding to the trigger signal and cause the transmitting section to transmit the data signal, which includes the generated data. The controlling section is configured to cause the transmitting section to transmit the data signal at a first output power when the trigger receiving section receives the trigger signal of modulated waves. The controlling section is also configured to cause the transmitting section to transmit the data signal at a second output power, which is lower than the first output power, when the trigger receiving section receives the trigger signal of unmodulated waves.

The data signal transmitted at the second output power is harder to receive than the data signal transmitted at the first output power. This prevents leakage of the identification information.

Effects of the Invention

The present invention prevents leakage of identification information.

BRIEF DESCRIPTION OF THE DRAWINGS

FIG. 8 shows one example of data generated when a trigger receiving section of a second embodiment receives a trigger signal of unmodulated waves.

FIG. 9 shows the output power of a data signal transmitted when a trigger receiving section of a third embodiment receives a trigger signal of modulated waves.

FIG. 10 shows the output power of a data signal transmitted when a trigger receiving section of a third embodiment receives a trigger signal of unmodulated waves.

MODES FOR CARRYING OUT THE INVENTION

First Embodiment

A tire condition detecting device according to a first embodiment will now be described.

Figure 1:
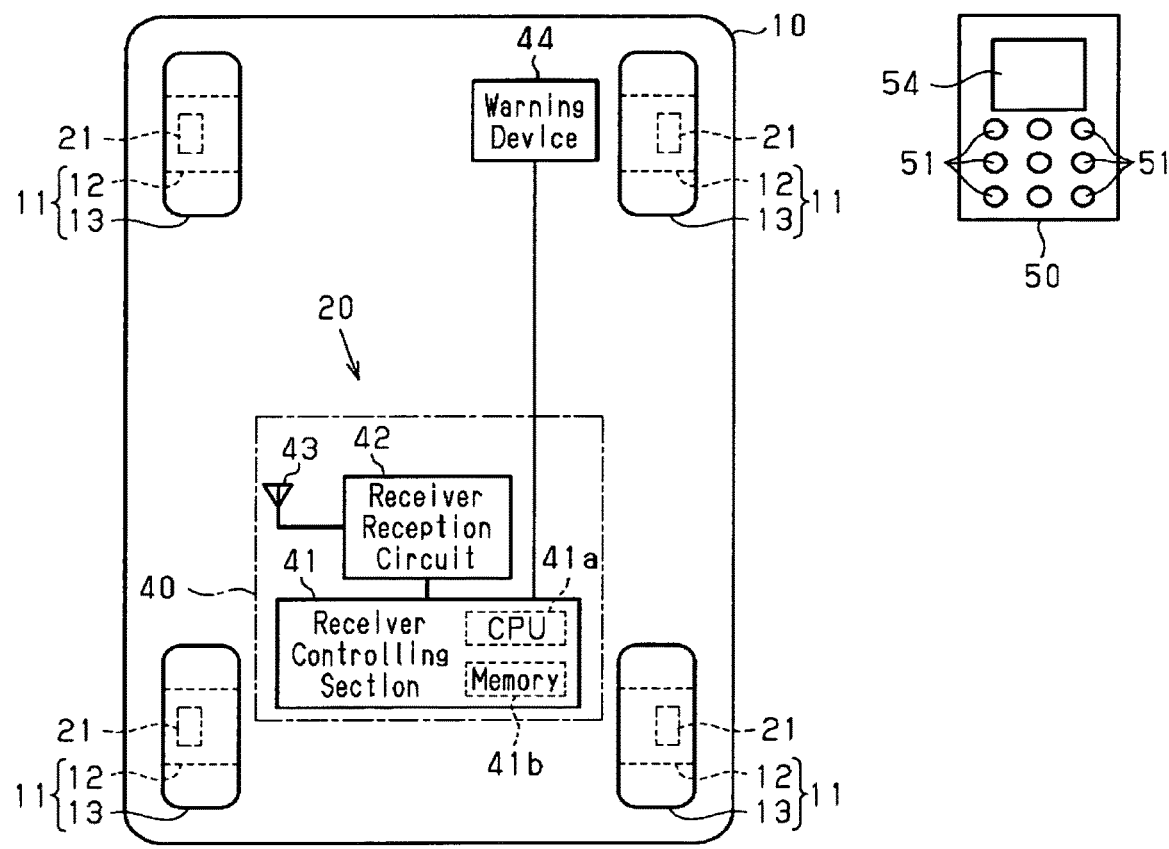
FIG. 1 is a schematic diagram of a condition monitoring apparatus and a trigger device according to a first embodiment.

As shown in FIG. 1, a tire condition monitoring apparatus 20 includes transmitters 21 and a receiver 40. Each transmitter 21 is attached to one of the four wheel assemblies 11 of a vehicle 10. The receiver 40 is installed in the vehicle 10. Each wheel assembly 11 includes a wheel 12 and a tire 13 attached to the wheel 12. Each transmitter 21 is fixed to the tire valve, the wheel 12, or the tire 13.

The transmitter 21 is attached to the wheel assembly 11 so as to be arranged in the inner space of the tire 13. Each transmitter 21, which serves as a tire condition detecting device, detects the condition (for example, the tire air pressure and tire internal temperature) of the corresponding tire 13 and wirelessly transmits a data signal including detected information of the tire 13 to the receiver 40. The tire condition monitoring apparatus 20 monitors the conditions of the tires 13 by receiving the data signals transmitted from the transmitters 21 at the receiver 40.

Figure 2:
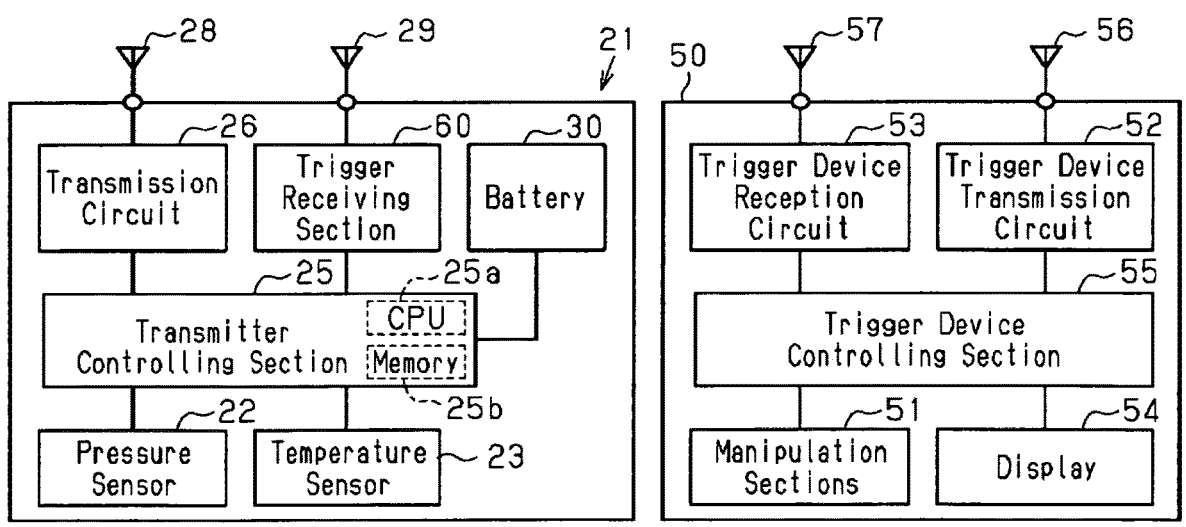
FIG. 2 is a schematic diagram of the transmitter and the trigger device according to a first embodiment.

As shown in FIG. 2, the transmitter 21 includes a pressure sensor 22, a temperature sensor 23, a transmitter controlling section 25, a transmission circuit 26, a trigger receiving section 60, a transmission antenna 28, a reception antenna 29, and a battery 30. The battery 30 serves as a power source for the transmitter 21.

The pressure sensor 22 detects the pressure (air pressure) of the corresponding tire 13. The pressure sensor 22 outputs the detection result to the transmitter controlling section 25. The temperature sensor 23 detects the temperature inside the corresponding tire 13. The temperature sensor 23 outputs the detection result to the transmitter controlling section 25. In the present embodiment, the pressure sensor 22 and the temperature sensor 23 function as a condition detecting section.

The transmitter controlling section 25, which serves as a controlling section, is composed of a microcomputer including a CPU 25a and a memory section 25b (such as a RAM and a ROM). In the memory section 25b, an ID code is registered, which is identification information unique to each transmitter 21. The memory section 25b stores various programs for controlling the transmitter 21.

The transmitter controlling section 25 may include dedicated hardware (application specific integrated circuit: ASIC) that executes at least part of various processes. That is, the transmitter controlling section 25 may be circuitry including 1) one or more processors that operate according to a computer program (software), 2) one or more dedicated hardware circuits such as an ASIC, or 3) a combination thereof. The processor includes a CPU and memories such as a RAM and a ROM. The memories store program codes or commands configured to cause the CPU to execute processes. The memories, or computer readable media, include any type of media that are accessible by general-purpose computers and dedicated computers.

The transmitter controlling section 25 acquires detection results detected by the pressure sensor 22 and the temperature sensor 23 at predetermined intervals (for example, every several seconds to several tens of seconds). The transmitter controlling section 25 generates data including, for example, a tire condition (for example, the tire air pressure and the tire internal temperature) and the ID code based on the detection results. The transmitter controlling section 25 outputs the generated data to the transmission circuit 26. The transmission circuit 26, which functions as a transmitting section, modulates the data from the transmitter controlling section 25 to generate a data signal (RF signal), and transmits the data signal through the transmission antenna 28. The transmitter controlling section 25 performs steady-state transmission, in which the data signal is transmitted periodically. The transmitter controlling section 25 performs encryption when generating data at the steady-state transmission. The encryption is performed by symmetric-key cryptography such as a block cipher mode or a stream cipher mode. The ID code is used as the common key.

As shown in FIG. 1, the receiver 40 includes a receiver controlling section 41, a receiver reception circuit 42, and a reception antenna 43. A warning device 44 is connected to the receiver controlling section 41. The receiver controlling section 41 is composed of a microcomputer including a receiver CPU 41a and a receiver memory section 41b (such as a ROM and a RAM). The receiver reception circuit 42 demodulates data signals transmitted from each transmitter 21 and received via the reception antenna 43, and delivers the demodulated signals to the receiver controlling section 41.

The receiver controlling section 41 acquires the conditions of the tires 13 (for example, the tire air pressure and the tire internal temperature) based on the data signals from the receiver reception circuit 42. When an anomaly occurs in any of the tires 13, the receiver controlling section 41 performs notification by using the warning device (notification device) 44. For example, the warning device 44 may be a device that notifies the user of the anomaly by sound, or illumination or blinking of light. The receiver may be a portable terminal carried by an occupant of the vehicle 10.

The transmitter 21 can perform various actions in response to a trigger signal transmitted from a trigger device 50. The trigger signal may be, for example, a signal for requesting the transmitter 21 to transmit a data signal, a signal for requesting the transmitter 21 to change the transmission interval of data signals, a signal for requesting the transmitter 21 to register an ID code in the memory section 25b, and a signal for updating the software of the transmitter 21. The trigger device 50 is found, for example, at dealers and production bases such as a factory that manufactures the transmitters 21 and a factory where the transmitters 21 are attached to the wheel assemblies 11.

When receiving a trigger signal via the trigger receiving section 60, the transmitter controlling section 25 causes the transmitter 21 to perform an action in accordance with the trigger signal.

Hereinafter, the trigger device 50 and the trigger receiving section 60 of the transmitter 21 will be described.

As shown in FIGS. 1 and 2, the trigger device 50 includes multiple manipulation sections 51, a trigger device transmission circuit 52, a trigger device reception circuit 53, a display 54, a trigger device controlling section 55, a trigger device transmission antenna 56, and a trigger device reception antenna 57. The manipulation sections 51 are manipulated by the user. The manipulation sections (switches) 51 correspond to actions that can be performed by the transmitter 21, and the trigger device 50 transmits a trigger signal for requesting an action according to the manipulation of any of the manipulation section 51.

The manipulation sections 51 are connected to the trigger device controlling section 55. The trigger device controlling section 55 generates data in correspondence with manipulation of the manipulation sections 51. As described above, the data includes data for requesting the transmitter 21 to transmit tire information.

The trigger device controlling section 55 outputs the generated data to the trigger device transmission circuit 52. The trigger device transmission circuit 52 generates a trigger signal corresponding to the data. The trigger signal is transmitted from the trigger device transmission antenna 56.

The trigger device reception circuit 53 receives the data signal (RF signal) transmitted (returned) from the transmitter 21 via the trigger device reception antenna 57. The trigger device reception circuit 53 demodulates the data signal and outputs it to the trigger device controlling section 55.

The types of the trigger device 50 include the one that employs carrier detect and the one that employs telegram as the communication method. The carrier detect is a method that uses unmodulated waves as the trigger signal. The telegram is a method that uses modulated waves as the trigger signal.

Figure 3A:
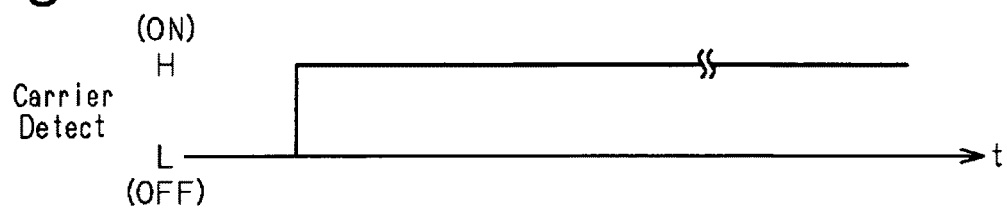
FIG. 3A is a diagram showing a trigger signal of unmodulated waves.

As shown in FIG. 3A, when the trigger device 50 employs the carrier detect, unmodulated waves in the LF band (for example, 125 kHz band) are used as the trigger signal.

Figure 3B:
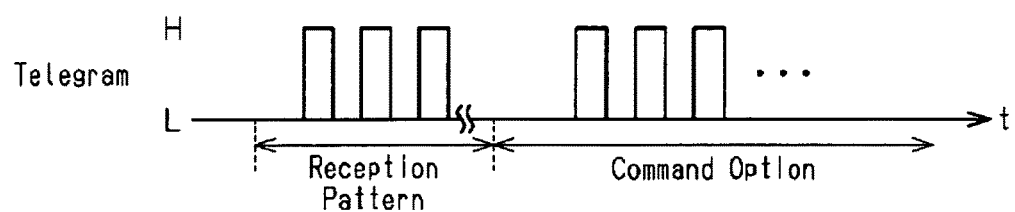
FIG. 3B is a diagram showing a trigger signal of modulated waves.

As shown in FIG. 3B, when the trigger device 50 employs the telegram, for example, a signal obtained by modulating a digital signal obtained by encoding data of 73 bits in total is used as the trigger signal. The encoding is executed, for example, by Manchester code. The modulation is executed, for example, with amplitude shift keying (ASK).

The above-mentioned 73-bit data includes a command option and a reception pattern (pattern including a preamble, a synchronization bit, and a wake-up ID) for causing the trigger receiving section 60 to recognize that it is a trigger signal. The reception pattern is defined by the telegram and is always the same. The command option differs depending on the action requested of the transmitter 21. The command option can request the transmitter 21 to perform the action corresponding to the manipulation section 51. The above data is not limited to 73-bit data, but may have other data lengths.

Next, the trigger receiving section 60 of the transmitter 21 will be described.

Figure 4:
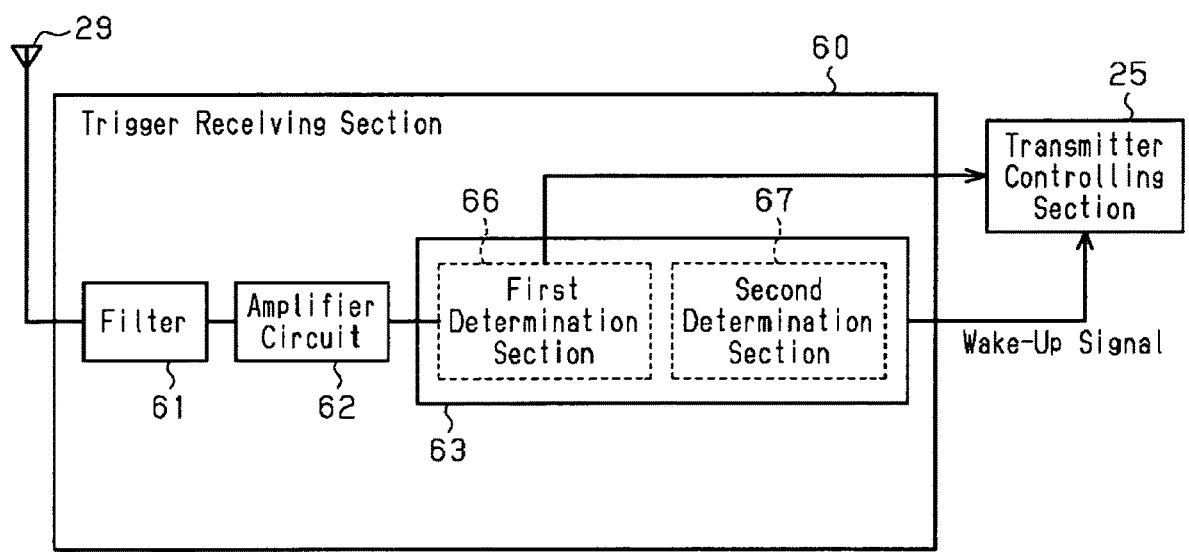
FIG. 4 is a schematic diagram of the trigger receiving section of the first embodiment.

As shown in FIG. 4, the trigger receiving section 60 includes a filter 61 for passing only a signal of a specific frequency band out of signals arriving at the reception antenna 29, an amplifier circuit 62 for amplifying a signal passing through the filter 61, and a determination section (determination circuit) 63 for determining whether the amplified signal is a trigger signal.

The filter 61 removes noise by permitting passage of signals of, for example, an LF band (for example, a 125 kHz band). The amplifier circuit 62 is composed of, for example, an amplifier of which the gain is variable, or multiple amplifiers having different gains.

The trigger receiving section 60 of the present embodiment is capable of receiving both of a trigger signal of unmodulated waves and a trigger signal of modulated waves. The determination section 63 includes a first determination section 66 (first determination function), which determines whether a signal is a trigger signal of unmodulated waves, and a second determination section 67 (second determination function), which determines whether a signal is a trigger signal of modulated waves.

The first determination section 66 determines whether the received signal strength indicator (RSSI) of a signal is greater than or equal to a threshold value. If the RSSI continues to be greater than or equal to the threshold value for more than a predetermined time (for example, 3 seconds), the first determination section 66 determines that the signal sent from the amplifier circuit 62 is a trigger signal of unmodulated waves.

The second determination section 67 determines whether the reception pattern included in a signal matches a predetermined reception pattern (reception pattern defined by the telegram). When the reception pattern included in the signal matches the predetermined reception pattern, the second determination section 67 determines that the signal sent from the amplifier circuit 62 is a trigger signal of unmodulated waves.

Figure 5:
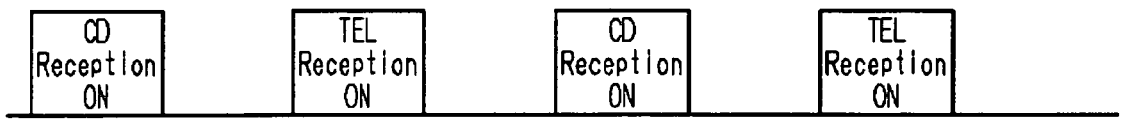
FIG. 5 is a schematic diagram showing a reception mode of the trigger receiving section of the first embodiment.

As shown in FIG. 5, the determination section 63 alternately repeats the determination by the first determination section 66 (CD reception ON in the drawing) and the determination by the second determination section 67 (TEL reception ON in the drawing). Accordingly, the determination section 63 is capable of receiving both of a trigger signal of unmodulated waves and a trigger signal of modulated waves.

The determination section 63 has a function of sending a wake-up signal to the transmitter controlling section 25. Since there are only a few opportunities to receive trigger signals, the transmitter controlling section 25 turns off the reception function until receiving a wake-up signal to save power. The transmitter controlling section 25 acquires a trigger signal upon reception of the wake-up signal. As a result, the transmitter controlling section 25 recognizes the action requested by the trigger device 50. "Reception" in the trigger receiving section 60 refers to having the transmitter controlling section 25 receive the data included in a trigger signal.

As described above, when the trigger receiving section 60 receives a trigger signal, the transmitter controlling section 25 performs the action corresponding to the trigger signal. This action can be an action to transmit (return) the data signal to the trigger device 50. When transmitting a data signal to the trigger device 50, the transmitter controlling section 25 differentiates the data to be generated depending on whether the received trigger signal is a trigger signal of unmodulated waves or a trigger signal of modulated waves.

When the trigger receiving section 60 receives a trigger signal of unmodulated waves, the transmitter controlling section 25 generates encrypted data and causes the transmission circuit 26 to transmit a data signal including the data. The data corresponds to the trigger signal. In the present embodiment, the command by a trigger signal of unmodulated waves is transmission of a predetermined data signal. When the trigger receiving section 60 receives a signal of which the RSSI is greater than or equal to the threshold value, the transmitter 21 transmits the predetermined data signal.

Figure 6:
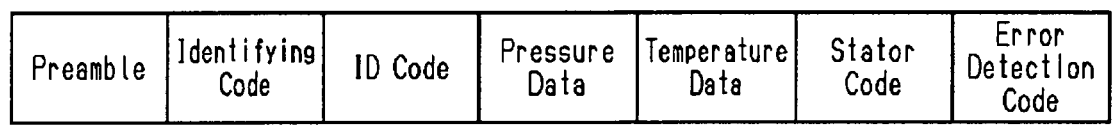
FIG. 6 shows one example of data generated when the trigger receiving section of the first embodiment receives a trigger signal of unmodulated waves.

As shown in FIG. 6, the data generated by the transmitter controlling section 25 includes, for example, a preamble, an identifying code, an ID code, pressure data, temperature data, a status code, and an error detection code. The encryption is performed by symmetric-key cryptography such as a block cipher mode or a stream cipher mode. The ID code is used as the common key, which is the key.

Figure 7:
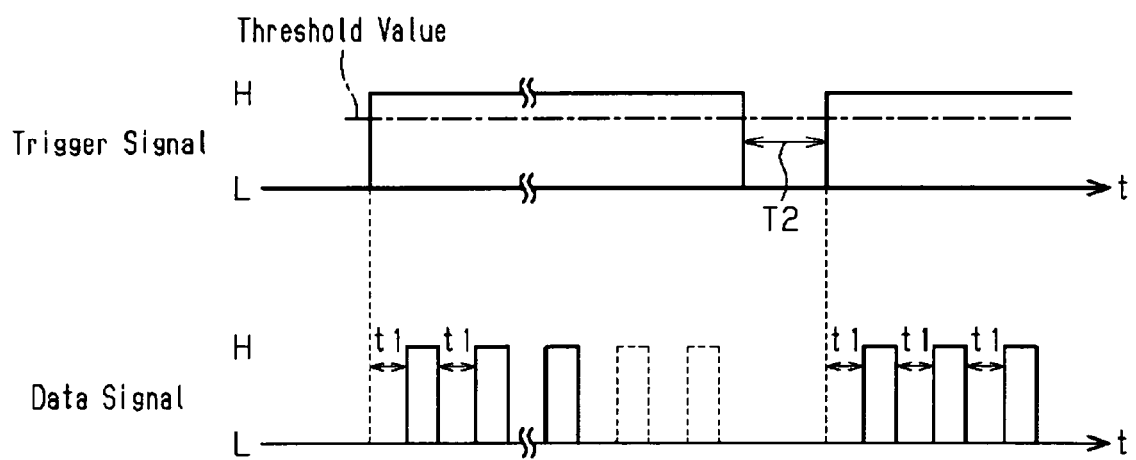
FIG. 7 is a diagram illustrating an action performed by the trigger receiving section of the first embodiment.

As shown in FIG. 7, the transmitter controlling section 25 monitors the time during which the RSSI is maintained at or above the threshold value (reception time of a trigger signal of unmodulated waves). The transmitter controlling section 25 causes the data signal to be transmitted at a predetermined interval t1 if the time during which the RSSI is maintained at or above the threshold value is shorter than or equal to a predetermined time.

The transmitter controlling section 25 imposes a limit on the number of times of data signal transmission when the time during which the RSSI is maintained at or above the threshold value exceeds the predetermined time. That is, as indicated by the broken lines in FIG. 7, when the number of times of transmission reaches the limit, the transmitter controlling section 25 performs control such that the data signal is not transmitted even if it receives a trigger signal of unmodulated waves.

The predetermined time is set to be slightly longer than the longest time during which a trigger signal can be continuously transmitted, for example, by the trigger device 50. That is, the predetermined time is set to such a time that it can be determined that a signal different from the trigger signal is received when the RSSI is maintained at or above the threshold value beyond the predetermined time. The limit on the number of times of transmission is set taking into consideration, for example, the power consumption of the battery 30 due to continuing data transmission. The limit on the number of times of transmission is for example, twenty times.

The transmitter controlling section 25 cancels the limit on the number of times of transmission when the time during which the RSSI is below the threshold value exceeds cancel time t2. The cancel time t2 at the time of canceling the limit on the number of times of transmission may be the same as or different from the predetermined time at the time of imposing the limit on the number of times of transmission.

When the trigger receiving section 60 receives a trigger signal of modulated waves, the transmitter controlling section 25 generates non-encrypted data and causes the transmission circuit 26 to transmit a data signal including the data. The data includes an ID code and information requested by the command option. For example, if transmission of pressure data is requested by the command option, the data includes an ID code and pressure data.

An operation of the transmitter 21 of the present embodiment will now be described.

The types of the trigger device 50 include the one that employs carrier detect and the one that employs telegram. The carrier detect can request the transmitter controlling section 25 to transmit a predetermined data signal. On the other hand, the telegram can request various actions from the transmitter controlling section 25 depending on the command option. The telegram can request a greater number of actions of the transmitter controlling section 25 than the carrier detect.

Generally, a trigger device 50 using the telegram is mainly used at a production base at which transmitters 21 are manufactured and attached to the wheel assemblies 11. This is because, in the production process, it is necessary to request the transmitter controlling section 25 to perform various actions such as checking of operation of the transmitter 21 and transmission for registering the ID in the receiver 40.

Some dealers, filling stations, and the like only have a trigger device 50 using the carrier detect. This is due to the fact that trigger devices 50 using the carrier detect had been spread before the trigger devices 50 using the telegram. Since installation of a trigger device 50 using the telegram requires capital investment, there are cases where only a trigger device 50 using the carrier detect is installed. Also, since the trigger device 50 is mainly used for daily inspection in dealers and filling stations, it is not necessary to request various actions from the transmitter controlling section 25 as in the case of the telegram. This is another reason why trigger devices 50 using the telegram are installed in a limited number of dealers and filling stations.

Since it is difficult to imitate a trigger signal of modulated waves, the leakage (skimming) of the ID code can be prevented by using a trigger receiving section that receives only trigger signals of modulated waves. However, operation of the transmitter 21 cannot be checked by using a trigger device 50 that uses the carrier detect in this case.

The transmitter 21 of the present embodiment is capable of receiving both trigger signals of unmodulated waves and trigger signals of modulated waves. When the trigger receiving section 60 receives a trigger signal of unmodulated waves, the transmitter controlling section 25 causes a data signal including encrypted data to be transmitted. In contrast, when the trigger receiving section 60 receives a trigger signal of modulated waves, the transmitter controlling section 25 causes a data signal including non-encrypted data to be transmitted.

The above-described embodiment has the following advantage.

(1-1) When the trigger receiving section 60 receives a trigger signal of unmodulated waves, the transmitter controlling section 25 generates encrypted data and causes to the transmission circuit 26 to transmit a data signal including the data. Even if a third person transmits a signal that imitates a trigger signal of unmodulated waves to the transmitter 21 and receives the data signal, that person cannot decrypt the encrypted data unless he/she has the key. In contrast, a person who carries out inspection or the like with the trigger device 50, such as the vehicle owner, the manufacturer of the transmitter 21, or the like, knows the key and can decrypt the data using the key. Therefore, it is possible to prevent leakage of the ID code to a third person who does not know the key.

When the trigger receiving section 60 receives a trigger signal of modulated waves, the transmitter controlling section 25 causes the transmission circuit 26 to transmit a data signal including non-encrypted data. In order to imitate a trigger signal of modulated waves, it is necessary to imitate the reception pattern. It is thus difficult to imitate a trigger signal of modulated waves as compared with a trigger single of unmodulated waves. When a trigger signal of modulated waves is received, that signal is unlikely to be an imitated signal. Therefore, when a trigger signal of modulated waves is received, a data signal is transmitted without being encrypted. Thus, when the ID code is required, the ID code can be easily acquired.

(1-2) The ID code is used as the encryption key (common key). The ID code is separately set for each transmitter 21. By using the ID code as the key for encryption, it is possible to perform encryption using separate keys for the respective transmitters 21. In encryption of data using a common key, if leakage of the key allows encrypted data to be decrypted for all the transmitters 21, leading to leakage of the ID codes. In contrast, by using separate keys, encrypted data is only decrypted for the transmitter 21 that uses the single leaked key. Therefore, it is possible to further suppress leakage of the ID codes of the transmitters 21.

(1-3) Even if the trigger receiving section 60 receives a trigger signal of modulated waves, the trigger device 50 using the telegram needs to decrypt the received data when a data signal including encrypted data is transmitted. As mentioned above, at a production base, inspection is mainly conducted by a trigger device 50 using the telegram. At a production base, inspections must be conducted for indefinite number of transmitters 21. At this time, if the keys are different for the respective transmitters 21, it is necessary to obtain the key for each transmitter 21, which complicates the inspection work. In contrast, when the trigger receiving section 60 receives a trigger signal of modulated waves, encryption of data is executed, which limits the complication of the inspection work.

(1-4) When receiving a signal of which the RSSI is greater than or equal to the threshold value, the transmitter controlling section 25 determines that the signal is a trigger signal of unmodulated waves. Therefore, under the environment in which signals in the frequency band of the trigger signal continue to be transmitted, it may be mistakenly determined that a trigger signal is being transmitted. For example, in a parking lot or on a freeway, there are cases where LF signals are output in the vicinity of the 125 kHz band in order to detect vehicles. If a signal for detecting a vehicle is mistaken for a trigger signal while the vehicle 10 is in a stopped state in a parking lot, the transmitter controlling section 25 causes the transmission circuit 26 to transmit data signal. If there is no limit on the number of times of transmission of data signals, data signals will continue to be transmitted as long as the vehicle 10 is parked in a parking lot. In contrast, if a signal of which the RSSI is greater than or equal to the threshold value continues to be received for a time longer than the predetermined time, the signal is determined not to be a trigger signal, and a limit is imposed on the number of transmission. This prevents the data signal from continuing to be transmitted. Therefore, the power consumption of the battery 30 is reduced.

Second Embodiment

A tire condition detecting device according to a second embodiment will now be described. In the following description, detailed explanations for those components that are the same as the corresponding components of the first embodiment will be omitted.

The transmitter 21, which serves as a tire condition detecting device, determines whether to include the ID code in the data depending on whether a trigger signal of unmodulated waves or a trigger signal of modulated waves is received.

When the trigger receiving section 60 receives a trigger signal of unmodulated waves, the transmitter controlling section 25 generates data including no ID code. As shown in FIG. 8, the data generated by the transmitter controlling section 25 includes, for example, a preamble, an identifying code, pressure data, temperature data, a status code, and an error detection code. The data is regarded to include pressure data and temperature data, which are detection results of the condition detecting section. When the trigger receiving section 60 receives a trigger signal of unmodulated waves, the transmitter controlling section 25 does not encrypt the data.

When the trigger receiving section 60 receives a trigger signal of modulated waves, the transmitter controlling section 25 generates non-encrypted data that includes the ID code. The data includes information requested by the command option included in the trigger signal as with the first embodiment.

Therefore, in addition to the advantages (1-3) and (1-4) of the first embodiment, the present embodiment has the following advantages.

(2-1) Even if a third person imitates a trigger signal of unmodulated waves and receives the data signal, the data signal does not include the ID code. This prevents leakage of the ID code.

Third Embodiment

A tire condition detecting device according to a third embodiment will now be described. In the following description, detailed explanations for those components that are the same as the corresponding components of the first embodiment will be omitted.

The transmitter 21, which serves as a tire condition detecting device, differentiates the output power of the data signal (signal strength) depending on whether a trigger signal of unmodulated waves or a trigger signal of modulated waves is received.

As shown in FIG. 9, when the trigger receiving section 60 receives a trigger signal of modulated waves, the transmitter controlling section 25 causes the transmission circuit 26 to transmit a data signal at a first output power [dBm]. The first output power is the same as the output power of the data signal transmitted during the steady-state transmission.

As shown in FIG. 10, when the trigger receiving section 60 receives a trigger signal of unmodulated waves, the transmitter controlling section 25 causes the transmission circuit 26 to transmit a data signal at a second output power [dBm], which is lower than the first output power [dBm]. The second output power is set within a range that allows the trigger device 50, located outside the tire 13, to receive the data signal.

Even when receiving either a trigger signal of modulated waves or a trigger signal of unmodulated waves, the transmitter 21 of the third embodiment does not encrypt the data. Also, when either a trigger signal of modulated waves or a trigger signal of unmodulated waves is received, data including the ID code is generated.

The above-described embodiment has the following advantage.

(3-1) A data signal transmitted at the second output power has a shorter propagation distance than a data signal transmitted at the first output power and is harder to receive than a data signal transmitted at the first output power. In order to receive a data signal transmitted at the second output power, it is necessary to get closer to the transmitter 21 (vehicle 10) than to receive a data signal transmitted at the first output power. This prevents leakage of the ID code.

(3-2) Even when a trigger signal of modulated waves is received, the power consumption of the battery 30 can be reduced as compared with a case in which a data signal is transmitted at the first output power.

(3-3) The first output power is the same as the output power of the data signal transmitted during the steady-state transmission. Therefore, by transmitting a trigger signal of unmodulated waves, it is possible to check whether the output of the transmitter 21 is normal.

The embodiments may be modified as follows.

In the first embodiment, the public-key cryptography may be used as the encryption method. In this case, the ID code is used as the private key, which is a key.

In the first embodiment, a key other than the ID code may be used. In this case, it is preferable to set different keys for the respective transmitters 21.

In the first embodiment, data generated at the steady-state transmission and data generated when a trigger signal of unmodulated waves is received may be encrypted using different keys.

In the first embodiment, information based on the ID code may be used as the key. For example, part of the ID code may be used as the key. Alternatively, the ID code with fixed data added may be used as the key. If part of the ID code is used as the key, the encryption and decryption processes will be simplified. When using the ID code with fixed data added as the key, leakage of the ID code is further suppressed. Even when using information based on the ID code as the key, it is possible to use separate keys for the respective transmitter 21.

In the first embodiment, the data generated by the transmitter controlling section 25 when the trigger receiving section 60 receives a trigger signal of unmodulated waves may be any data. For example, the data does not need to include the pressure data or the temperature data. The data also does not need to include the ID code.

If the data does not include the ID code, the data includes variable data and operation data. Examples of the variable data include pressure data and temperature data. Examples of the operation data include an error detection code or an error correction code. The operation data is data calculated from the ID code, which is fixed data, and variable data. When transmitting a trigger signal of unmodulated waves, the trigger device 50 already has obtained the ID code of the transmitter 21. Therefore, the trigger device 50 can calculate operation data from the variable data and the ID code included in the data signal. That is, upon receiving the data signal, the trigger device 50 can calculate the operation data using the variable data included in the data. The trigger device 50 checks the agreement between the operation data included in the data signal and the operation data obtained through the calculation by the trigger device 50, thereby acquiring which one of the transmitters 21 attached to the wheel assemblies 11 of the vehicle 10 has transmitted the data signal. The use of the operation data prevents a third person who does not know the ID code from obtaining the ID code. The operation data can be regarded as being encrypted. Therefore, the data including the operation data can be regarded as encrypted data.

In the second embodiment, when the trigger receiving section 60 receives a trigger signal of unmodulated waves, the transmitter controlling section 25 may generate data including the operation data described above. In this case, the transmitter controlling section 25 can generate encrypted data that does not include the ID code.

In the second embodiment, when the trigger receiving section 60 receives a trigger signal of unmodulated waves, the transmitter controlling section 25 may generate data that does not include the ID code but include unique data other than the ID code. That is, when the trigger receiving section 60 receives a trigger signal of unmodulated waves, the transmitter controlling section 25 only needs to generate data including at least one of the unique data other than the ID code and the detection result of the condition detecting section. Examples of the unique data include the product code determined by the manufacturer, the version information of the IC or the software, the inspection history, the failure history, the ROM dump, and the like. The unique data does not refer to data that has a different value each time the data is generated as in the case of the detection result of the condition detecting section, but refers to data that is not changed from the time of manufacturing and until update is made.

In the second embodiment, when the trigger receiving section 60 receives a trigger signal of unmodulated waves, data that does not include the ID code is generated. Since the data does not include the ID code, in a case in which a data signal is transmitted from any of multiple transmitters 21, the trigger device 50 may not be able to determine which transmitter 21 has transmitted the received data signal. To transmit a trigger signal from the trigger device 50, the trigger device 50 is brought close to the transmitter 21 to be given the command and the trigger signal is transmitted. Therefore, the trigger signal may be transmitted only to a specific transmitter 21 by causing the trigger signal to have directivity or adjusting the output power of the trigger signal. Also, when receiving multiple data signals, the trigger device 50 may determine that the data signal with the greatest RSSI has been transmitted from the transmitter 21 having given the command.

In the second embodiment, when the trigger receiving section 60 receives a trigger signal of modulated waves, the transmitter controlling section 25 may generate encrypted data that includes the ID code. In this case, the ID code itself or the information based on the ID code may be used as the key of encryption. Alternatively, other information may be used as the key.

In the third embodiment, the first output power may be different from the output power of transmission data transmitted during the steady-state transmission. Also, the data signal may be transmitted at the same output power as the output power of the transmission data transmitted at the steady-state transmission only when a specific command option among multiple command options of the trigger signal is received.

The processes of the embodiments may be combined. For example, the process described in the first embodiment may be combined with the process described in the third embodiment. When receiving a trigger signal of unmodulated waves, the transmitter controlling section 25 generates encrypted data and transmits a data signal including the data. At this time, when receiving a trigger signal of modulated waves, the transmitter controlling section 25 may transmit the data signal at the second output power, which is lower than the first output power, when transmitting the data signal.

The first embodiment and the second embodiment may be combined. When receiving a trigger signal of unmodulated waves, the transmitter controlling section 25 generates encrypted data that does not include the ID code and transmits a data signal including the data.

The second embodiment and the third embodiment may be combined. When receiving a trigger signal of modulated waves, the transmitter controlling section 25 generates data including the ID code and causes the data signal including the data to be transmitted at the first output power. When receiving a trigger signal of unmodulated waves, the transmitter controlling section 25 generates data that does not include the ID code and causes the data signal including the data to be transmitted at the second output power, which is lower than the first output power.

In each embodiment, when a signal having an RSSI greater than or equal to the threshold value continues to be received for a period longer than the predetermined time, the output power of the data signal may be reduced to be lower than that before the predetermined time elapses. Also, when a signal having an RSSI greater than or equal to the threshold value continues to be received for a period longer than the predetermined time, the transmission interval of the data signal may be extended to be longer than that before the predetermined time elapses. Furthermore, these modifications may be combined. Specifically, when a signal of which the RSSI is greater than or equal to the threshold value continues to be received for a period longer than the predetermined time, the output power of the data signal may be reduced to be lower than that before the predetermined time elapses, and the transmission interval of the data signal may be extended to be longer than that before the predetermined time elapses.

In each embodiment, a trigger signal of unmodulated waves (trigger signal of carrier detect) may also be switched between transmission (on) and stop of transmission (off) to generate a pattern, so that various commands can be given to the transmitter 21.

In each embodiment, the condition detecting section may be any device that detects the condition of the tire 13. For example, an acceleration sensor for detecting acceleration acting on the tire 13 may be provided. In each embodiment, it is sufficient if at least one type of condition detecting section is provided.

In each embodiment, the data generated during the steady-state transmission does not need to be encrypted.

In each embodiment, the bit rate (transmission speed) of the data signal, the frequency of the data signal, the data length of the data signal, the frame interval of the data signal, and the like may be different between when the trigger receiving section 60 receives a trigger signal of unmodulated waves and when the trigger receiving section 60 receives a trigger signal of modulated waves. In the case of using frequency modulation (FM) as the modulation method, the frequency shift width may be different between when the trigger receiving section 60 receives a trigger signal of unmodulated waves and when the trigger receiving section 60 receives a trigger signal of modulated waves. Further, the error detection code (or the error correction code) included in the data signal may be different between when the trigger receiving section 60 receives a trigger signal of unmodulated waves and when the trigger receiving section 60 receives a trigger signal of modulated waves.

In each embodiment, the vehicle may be a motorcycle or a vehicle having five or more wheel assemblies.

In each embodiment, the frequency band of the trigger signal and the data signal may be changed as necessary. For example, signals of 2.4 Ghz band may be used.

In each embodiment, the battery 30 may be a primary battery or a rechargeable battery. A capacitor may be used as the power source.

DESCRIPTION OF THE REFERENCE NUMERALS

13 . . . Tire, 21 . . . Transmitter (Condition Detecting Device), 22 . . . Pressure Sensor (Condition Detecting Section), 23 . . . Temperature Sensor (Condition Detecting Section), 25 . . . Transmitter Controlling Section (Controlling Section), 25b . . . Memory Section, 26 . . . Transmission Circuit (Transmitting Section), 50 . . . Trigger Device, 60 . . . Trigger Receiving Section.

The invention claimed is:

1. A tire condition detecting device comprising:
a sensor, which is configured to detect a condition of a tire;
a memory, which stores identification information;
a transmission circuit, which is configured to transmit a data signal;
a trigger receiver, which is configured to receive a trigger signal transmitted from a trigger device; and
circuitry, which is configured to, when the trigger receiver receives the trigger signal, generate data corresponding to the trigger signal and cause the transmission circuit to transmit the data signal, which includes the generated data,
wherein the circuitry is configured to
generate data that is encrypted when the trigger receiver receives a trigger signal of unmodulated waves, and
generate data that is non-encrypted when the trigger receiver receives a trigger signal of modulated waves.

2. The condition detecting device according to claim 1, wherein the circuitry is configured to generate the encrypted data using, as a key, the identification information itself or information based on the identification information.

3. A tire condition detecting device comprising:
a sensor, which is configured to detect a condition of a tire;

a memory, which stores identification information;
a transmission circuit, which is configured to transmit a data signal;
a receiver, which is configured to receive a trigger signal transmitted from a trigger device; and
circuitry, which is configured to, when the trigger receiver receives the trigger signal, generate data corresponding to the trigger signal and cause the transmission circuit to transmit the data signal, which includes the generated data,
wherein the circuitry is configured to
generate data that does not include the identification information when the trigger receiver receives a trigger signal of unmodulated waves, and
generate data that includes the identification information when the trigger receiver receives a trigger signal of modulated waves.

4. A tire condition detecting device comprising:
a sensor, which is configured to detect a condition of a tire;
a memory, which stores identification information;
a transmission circuit, which is configured to transmit a data signal;
a trigger receiver, which is configured to receive a trigger signal transmitted from a trigger device; and
circuitry, which is configured to, when the trigger receiver receives the trigger signal, generate data corresponding to the trigger signal and cause the transmission circuit to transmit the data signal, which includes the generated data,
wherein the circuitry is configured to
cause the transmission circuit to transmit the data signal at a first output power when the trigger receiver receives a trigger signal of modulated waves, and
cause the transmission circuit to transmit the data signal at a second output power, which is lower than the first output power, when the trigger receiver receives a trigger signal of unmodulated waves.

* * * * *